June 22, 1937.  F. L. BYRON  2,084,939
DEFLATION INDICATOR SWITCH
Filed Sept. 5, 1936
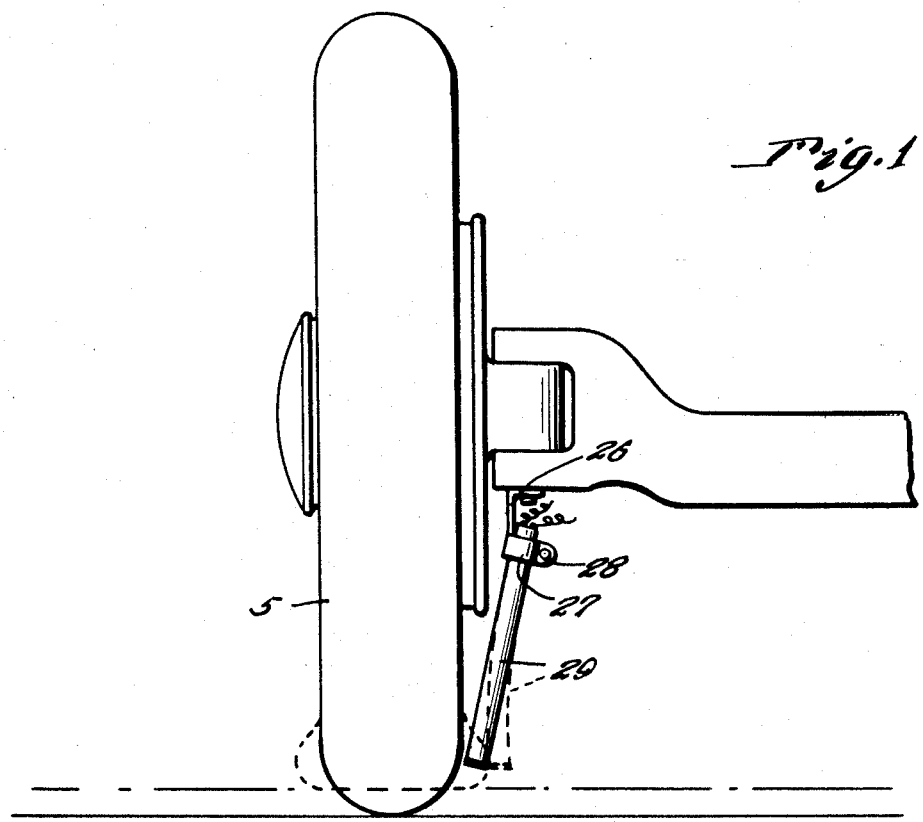
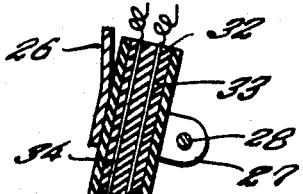
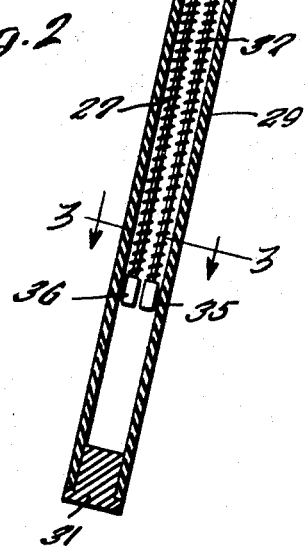
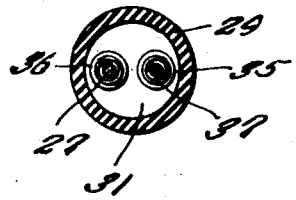
Inventor
F. L. Byron
By Clarence A. O'Brien
Hyman Berman
*Attorneys*

Patented June 22, 1937

2,084,939

UNITED STATES PATENT OFFICE 2,084,939

DEFLATION INDICATOR SWITCH

Frank L. Byron, Delta, Utah

Application September 5, 1936, Serial No. 99,641

1 Claim. (Cl. 200—58)

This invention appertains to new and useful improvements in means for indicating the deflated condition of automobile pneumatic tires.

An important object of the invention is to provide a simple and inexpensive device in the form of a switch which can be associated with the tires of a car so that when a tire becomes deflated the lateral bulging effect of the tire will actuate the switch and close an alarm circuit so as to indicate to the driver that one of his tires has become deflated.

Another important object of the invention is to provide an indicator of the character stated which will be positive acting, substantially foolproof and not susceptible to the development of ready defects.

Various other important objects and advantages of the invention will become apparent to th reader of the following specification.

In the drawing:

Figure 1 represents a fragmentary elevational view showing the switch associated with a vehicle wheel.

Figure 2 is a longitudinal sectional view through one of the switches.

Figure 3 is an enlarged cross sectional view on the line 3—3 of Figure 2.

Referring to the drawing, wherein like numerals designate like parts, it can be seen that numeral 5 denotes a wheel of a vehicle.

Referring to Figures 2 to 4 inclusive, it can be seen that the switches consist of an L-shaped bracket member 26 the lower end of which is secured to a split clamp 27 having a screw 28 whereby the clamp can be bound around the upper end portion of the flexible tubular casing 29.

The lower end of the tubular casing 29 is provided with a di-electric plug 31 while a similar plug 32 is inserted in the upper end of the tube 29. Extending longitudinally through the plug 32 at a substantial distance downwardly into the casing 29 are the stiff spring wires 33—34. The lower ends of these spring wires 33—34 are provided with normally spaced contacts 35—36 respectively and coiled compressible spring members 37 are provided on these spring wires 33—34. The casing 29 extends in a direction so as to be normally in close spaced relation to the corresponding wheel 5 or 6. Obviously, when the tire 5 or 6 becomes deflated, it bulges laterally and in so doing it will flex the casing 29 to the end that the contacts 35—36 will be brought together and close the circuit of the corresponding wheel 6.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

An electrical switch of the class described comprising a flexible tubing, a pair of conductors extending into said tubing at one end thereof, and elongated coil spring members extending longitudinally in said tubing and through which said conductors extend, contact members at the lower ends of said spring members in normal spaced relation adapted to be brought together when said tubing is flexed to close said contact.

FRANK L. BYRON.